US00RE40740E

(19) United States
(12) Reissued Patent
Oueslati et al.

(10) Patent Number: US RE40,740 E
(45) Date of Reissued Patent: Jun. 16, 2009

(54) INTEGRATED JOYPAD FOR HANDHELD COMPUTER

(75) Inventors: Hatem Oueslati, Lunel (FR); Renaud Malaval, La Grande Motte (FR)

(73) Assignee: Palm, Inc., Sunnyvale, CA (US)

(21) Appl. No.: 11/585,995

(22) Filed: Oct. 18, 2006

Related U.S. Patent Documents

Reissue of:
(64) Patent No.: 6,806,865
Issued: Oct. 19, 2004
Appl. No.: 09/777,185
Filed: Feb. 5, 2001

(51) Int. Cl.
*G06F 3/033* (2006.01)
*G09G 5/08* (2006.01)

(52) U.S. Cl. ..... 345/161; 345/179; 463/38
(58) Field of Classification Search ..... 345/156, 345/160, 161, 173, 179
See application file for complete search history.

(56) References Cited

U.S. PATENT DOCUMENTS

| | | | | |
|---|---|---|---|---|
| 5,010,547 | A | 4/1991 | Johnson et al. | |
| 5,012,219 | A | 4/1991 | Henry | |
| 5,075,684 | A | 12/1991 | DeLuca | |
| 5,359,317 | A | 10/1994 | Gomez et al. | |
| D354,478 | S | 1/1995 | Miyahara | |
| 5,394,140 | A | 2/1995 | Wong et al. | |
| 5,430,436 | A | 7/1995 | Fennell | |
| RE35,342 | E | * 10/1996 | Louis et al. | 345/179 |

(Continued)

FOREIGN PATENT DOCUMENTS

EP 0 840 934 B1 5/1998

OTHER PUBLICATIONS

Compaq Product Information; iPAQ Pocket PC; Nov. 13, 2001; 3 pages.
Disabatino, Jennifer, TechnologyFuture Watch, Hands Full of Information, *Computerworld*; Nov. 6, 2000; vol. 34; No. 45; p. 68.
VisorPhone™ Module User Guide; Copyright © 2000–2001 Handspring, Inc.; 76 pages.
Motorola; Personal Communicator; Motorola, Inc.; Copyright © 2001; 3 pages.
Motorola; Personal Communicator; Model 009; User's Guide; Motorola, Inc.; Copyright © 2002; 5 pages.
Motorola; Personal Communicator; Model V100, GSM 1900 MHz; User's Guide; Motorola, Inc. Copyright © 2001; 6 pages.
Motorola Series 60g Wireless Phone; Mototola, Inc. Copyright © 2001; 3 pages.
Motorola Series 60i TDMA Wireless Phone; Motorola, Inc.; 3 pages.

(Continued)

*Primary Examiner*—Ricardo L Osorio
(74) *Attorney, Agent, or Firm*—Foley & Lardner LLP

(57) ABSTRACT

A handheld computer is disclosed. The handheld computer is configured with a housing, a display supported in the housing, and computing electronics supported in the housing and configured to communicate with the display. The handheld computer disclosed also includes an integrated input device configured to provide input to the handheld computer. The input device provides different input signals to the computing electronics dependent upon a directional movement provided by a user. The input device is configured to communicate more than four distinct directional movements from a user to the computing electronics.

Further, the handheld computer disclosed may include a joystick coupler which is integrated into a joypad. The joypad coupler is configured to receive at least a portion of the stylus which is configured to act as a joystick.

24 Claims, 1 Drawing Sheet

U.S. PATENT DOCUMENTS

| | | | | | |
|---|---|---|---|---|---|
| 5,612,682 | A | | 3/1997 | DeLuca et al. | |
| 5,650,776 | A | | 7/1997 | Mitchell et al. | |
| 5,705,995 | A | | 1/1998 | Laflin et al. | |
| 5,706,026 | A | * | 1/1998 | Kent et al. | 345/156 |
| 5,751,229 | A | * | 5/1998 | Funahashi | 341/5 |
| 5,790,100 | A | * | 8/1998 | Kikinis | 345/158 |
| 5,797,089 | A | | 8/1998 | Nguyen | |
| 5,825,675 | A | | 10/1998 | Want et al. | |
| D408,021 | S | | 4/1999 | Haitani et al. | |
| 5,903,852 | A | | 5/1999 | Schaupp, Jr. et al. | |
| 5,922,670 | A | | 7/1999 | Knuebel et al. | |
| 5,958,006 | A | | 9/1999 | Eggleston et al. | |
| D416,001 | S | | 11/1999 | Tal et al. | |
| 6,043,807 | A | * | 3/2000 | Carroll | 345/163 |
| 6,157,630 | A | | 12/2000 | Adler et al. | |
| 6,160,926 | A | | 12/2000 | Dow et al. | |
| 6,163,326 | A | * | 12/2000 | Klein et al. | 345/156 |
| 6,204,848 | B1 | | 3/2001 | Nowlan et al. | |
| D442,156 | S | | 5/2001 | Lee | |
| D445,135 | S | | 7/2001 | Najmi | |
| D446,199 | S | | 8/2001 | Xu et al. | |
| D450,307 | S | | 11/2001 | Xu et al. | |
| 6,377,685 | B1 | | 4/2002 | Krishnan | |
| 6,392,634 | B1 | * | 5/2002 | Bowers et al. | 345/163 |
| 6,397,078 | B1 | | 5/2002 | Kim | |
| 6,489,950 | B1 | | 12/2002 | Griffin et al. | |
| 6,563,487 | B2 | * | 5/2003 | Martin et al. | 345/156 |
| 6,563,493 | B2 | * | 5/2003 | Kobayashi et al. | 345/179 |
| 6,606,083 | B1 | * | 8/2003 | Murray et al. | 345/158 |
| 6,806,865 | B2 | * | 10/2004 | Oueslati et al. | 345/161 |
| 6,891,529 | B2 | | 5/2005 | Ladouceur et al. | |
| 6,957,397 | B1 | | 10/2005 | Hawkins et al. | |
| 7,120,473 | B1 | | 10/2006 | Hawkins et al. | |
| 7,356,361 | B1 | | 4/2008 | Hawkins et al. | |
| 2001/0027121 | A1 | | 10/2001 | Boesen | |
| 2002/0086702 | A1 | | 7/2002 | Lai et al. | |
| 2002/0097227 | A1 | | 7/2002 | Chu et al. | |
| 2002/0103616 | A1 | * | 8/2002 | Park et al. | 702/150 |
| 2002/0113771 | A1 | * | 8/2002 | Rosenberg et al. | 345/156 |
| 2004/0047505 | A1 | | 3/2004 | Ghassabian | |

OTHER PUBLICATIONS

Bedell, Doug; Personal Technology, *San Jose Mercury News*; Ways to Escape Multiple–Remote Hell; Thursday, Jun. 14, 2001; 3 pages.

Nokia 1990 Communicator; Quick Guide/Accessories Guide; Issue 3 EN; Copyright © Nokia Mobile Phones; 1999; 36 pages.

Pinkerton, Janet; Wireless Meets Computing, Again., The Other Side of Convergence; *Dealerscope;* Nov. 2000; vol. 42; No. 11; 2 pages.

ProQuest Information and Learning—PalmPiolt: The Ultimate Guide, 2nd Edition; Copyright © 1999, 1998 O'Reilly & Associates, Inc.; 87 pages.

hp invent; User'sGuide; hp iPAQ Pocket h4000 Series; Document Part No.: 343434–001; Aug. 2003; Copyright © 2003 Hewlett–Packard Company; Copyright © 2003 Hewlett–Packard Development Company, L.P.; 144 pages.

ZDNet IT Resource Centers, *Handspring adds color PDA, GameFace*, 2 pps., printed from the Internet web site zdnet.com/enterprise/stories/main/0,10228,2640711,00.html on Jan. 22, 2001.*

Handspring: Entertainment, *Accessories GameFace for VisorPrism*, 1 pp. printed from the Internet web site handspring.com/products/Product.jhtml?PRODID=625&CATID=624 on Jan. 22, 2001.*

* cited by examiner

FIG. 1
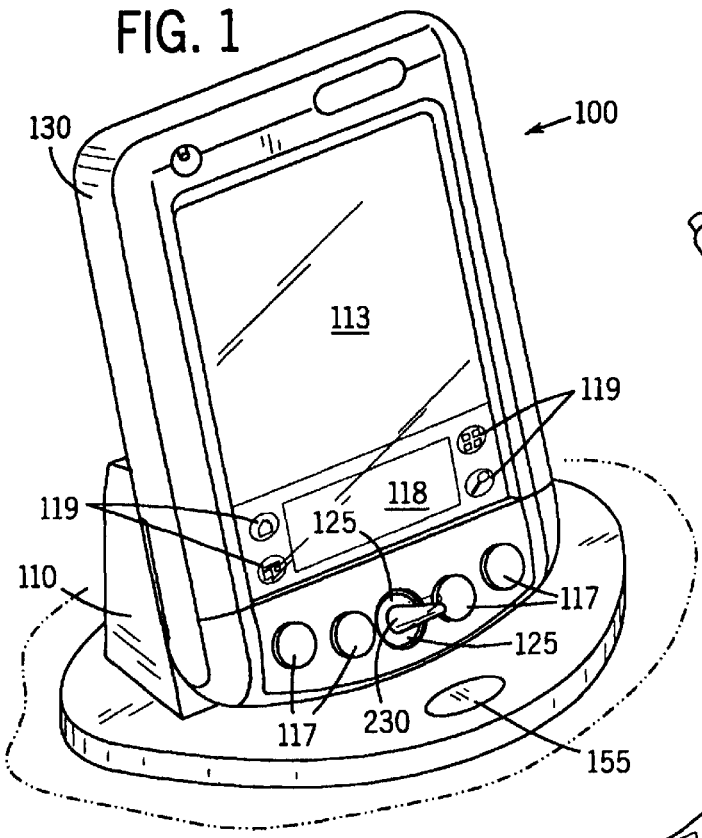
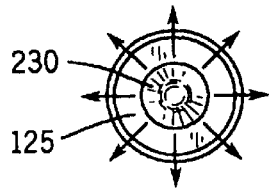
FIG. 6
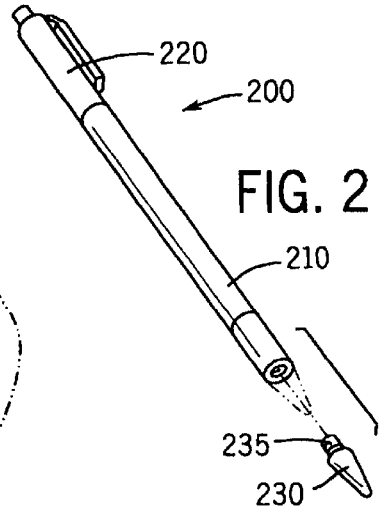
FIG. 2
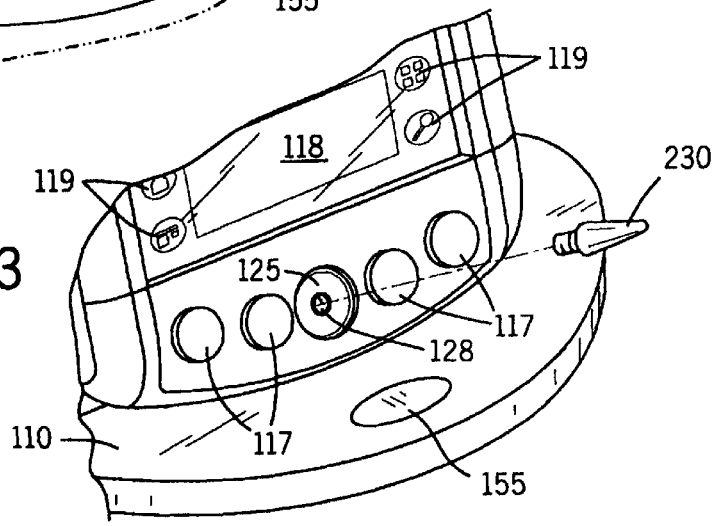
FIG. 3
FIG. 4
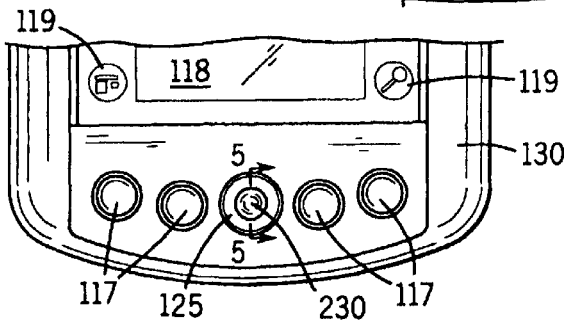
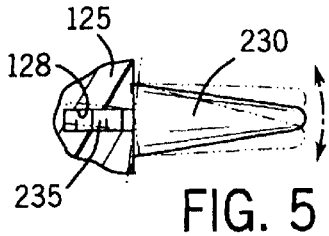
FIG. 5

INTEGRATED JOYPAD FOR HANDHELD COMPUTER

Matter enclosed in heavy brackets [ ] appears in the original patent but forms no part of this reissue specification; matter printed in italics indicates the additions made by reissue.

FIELD OF THE INVENTION

The invention relates to input devices typically used in handheld computing devices. In particular, the invention relates to an integrated joypad for a handheld computer. The integrated joypad is configured with a receptacle for receiving a graspable portion, such as a section of the stylus used with the handheld computer. The graspable portion of the stylus connected to the joypad receptacle is configured to form a joystick.

BACKGROUND OF THE INVENTION

Handheld computing devices, "palmtops", "palmhelds", personal digital assistants (PDAs), or handheld computers typically weigh less than a pound and fit in a pocket. These handhelds generally provide some combination of personal information management, database functions, word processing, and spreadsheets. Because of the small size and portability of handhelds, strict adherence to hardware constraints, such as input device hardware, must be maintained. It is conventional to have buttons on the handheld computer for providing user input to the handheld computer. Further, the buttons may be configured to be used for the playing of game software and/or navigating through application software.

Other conventional implementations of input devices for handheld computers include attachable joystick devices that may be attached onto the front face of the handheld computer.

Accordingly, there is a need for an integrated joypad for a handheld computer. Further, there is a need for an integrated joypad for a handheld computer which allows for the attachability of a portion of a stylus to create a joystick device.

The teachings herein below extend to those embodiments which fall within the scope of the appended claims, regardless of whether they accomplish one or more of the above mentioned needs.

SUMMARY OF THE INVENTION

An exemplary embodiment relates to a handheld computer. The handheld computer includes a housing and a display supported by the housing. The handheld computer also includes computing electronics supported by the housing and configured to communicate with the display. The handheld computer further includes an integrated input device configured to provide input to the handheld computer. The input device provides different input signals to the computing electronics dependent on a directional movement provided by a user. The input device is configured to communicate more than four distinct directional movements from a user to the computing electronics.

Another exemplary embodiment relates to a handheld computer. The handheld computer includes a housing, data processing electronics disposed within the housing, and a display disposed in the housing and coupled to the data processing electronics. The display includes a touch screen configured to be used with a stylus. The handheld computer also includes a joypad coupled to the data processing electronics and configured to communicate signals to the data processing electronics dependent on the direction in which the joypad is moved. The joypad is moveably integrated into the housing. Further, the handheld computer includes a joystick coupler integrated into the joypad. The joypad coupler is configured to receive at least a portion of the stylus which is configured to act as a joystick.

Further, an exemplary embodiment relates to a joystick device for a handheld computer. The handheld computer is configured to be used with a stylus. The joystick device includes an input device integrated into the handheld computer. The joystick device also includes a coupler integrated into the input device configured to couple at least a portion of the stylus to the input device.

Further still, an exemplary embodiment relates to a method of assembling a joystick for a handheld computer. The method includes providing a handheld computer with a joystick receptacle. The method also includes providing a stylus having a detachable portion. The method further includes detaching a detachable portion from the stylus. Further still, the method includes coupling the detachable portion to the receptacle.

BRIEF DESCRIPTION OF THE DRAWINGS

The invention will become more fully understood from the following detailed description, taken in conjunction with the accompanying drawings, wherein like reference numerals refer to like elements, in which:

FIG. 1 is an exemplary depiction of a handheld computer having an integrated joypad with a detachable joystick;

FIG. 2 is an exemplary depiction of a stylus having a detachable tip;

FIG. 3 is an exemplary depiction of a handheld computer with an integrated joypad and having the detachable joystick detached therefrom;

FIG. 4 is an exemplary front view of the input button array of the handheld computer with the joystick;

FIG. 5 is a cross sectional depiction of the joystick and joypad movement taken along line 5—5 of FIG. 4; and FIG. 6 is an exemplary diagram depicting discrete directions which a user may move the joystick.

DETAILED DESCRIPTION OF THE EXEMPLARY EMBODIMENTS

Referring to FIG. 1, a handheld computer 100 is depicted, being optionally detachably coupled to an accessory device 110, according to an exemplary embodiment. Handheld computer 100 may include Palm style computers manufactured by Palm, Inc., of Santa Clara, Calif. Other exemplary embodiments of the invention may include Windows CE™ handheld computers, or other handheld computers and personal digital assistants, as well as cellular telephones, and other mobile computing devices. Further, handheld computer 100 may be configured with or without accessory device 110 or optionally with any of a variety of other accessory devices. As shown, accessory device 110 may be, but is not limited to, a desktop cradle used for synchronizing with a personal computer or other device.

Preferably, handheld computer 100 includes interactive hardware and software that performs functions such as maintaining calendars, phone lists, task lists, notepads, calculation applications, spreadsheets, games, and other applications capable of running on a computing device. Handheld computer 100, shown in FIG. 1 includes a plurality of input functions, keys 117 and a display 113 having graphical user interface features. Display 113 may be provided with an interface that allows a user to select and alter displayed content using a pointer, such as, but not limited to, a stylus 200, an example of which is depicted in FIG. 2.

Referring again to FIG. 1, in an exemplary embodiment, display 113 also includes a Graffiti™ (or other handwriting recognition software) writing section 118 for tracing alphanumeric characters as input. A plurality of input buttons 119 for performing automated or preprogrammed functions may be provided on a portion of display 113. In a particular embodiment, display 113 is a touch screen display that is electronically responsive to movements of a stylus on the surface of display 113.

Accessory device 110 may be one of several types of accessories, such as, but not limited to, a desktop synchronization cradle device for serial and/or wireless data communications, a Universal Serial Bus (USB) device, or other communication device. Accessory device 110 may include one or more ports for parallel and/or serial data transfer with other computers or data networks. Handheld computer 100 may use the accessory device 110 for the purpose of downloading and uploading software such as, but not limited to, game software and for synchronizing data on handheld computer 100 with a personal computer, for example. In an exemplary embodiment, accessory device 110 couples to handheld computer 100 through an electrical connector located at a bottom portion of handheld computer 100. Button 155 on accessory 110 may effectuate an electrical connection between accessory device 110 and handheld computer 100 when the two are connected.

In an exemplary embodiment, handheld computer 100 may include an integrated joypad 125. Integrated joypad 125 may be a finger or thumb actuated button (see FIG. 3) which is moveable by a user in a plurality of directions. For example, integrated joypad 125 may be moveable in the up and down direction. In an alternative embodiment, integrated joypad 125 may be moveable in an up and down direction as well as a left and right direction. Further still, in an alternative embodiment, as indicated in FIG. 6, integrated joypad 125 may be moved in eight discrete directions, including up, down, left, right, and diagonal directions. For example, if one defines the right-hand direction as a reference (0°), the button may be moveable in the directions corresponding to 0°, 45°, 90°, 135°, 180°, 225°, 270°, and 315°. Yet further still, joypad 125 may be configured to be moved in a continuum of directions from 0–360 degrees and communicate an analog signal to computing electronics of handheld computer 100. Joypad 125 is electronically coupled to computing electronics and/or data processing electronics that are disposed within a housing 130 of handheld computer 100. Joypad 125 is configured to communicate an electrical signal to the computing or data processing electronics of handheld computer 100. The electrical signal corresponds to the direction in which the joypad is pressed.

In an exemplary embodiment, joypad 125 is integrated into handheld computer 100 such that it is movably supported by housing 130 or such that is movable within an aperture in housing 130. Because joypad 125 is configured to communicate directional input by a user in a plurality of directions, joypad 125 is useful as an input device for game programs or other applications which may be running on handheld computer 100 and for navigating around display 113.

Conventionally, for gaming, users utilize a plurality of keys 117 integrated into the housing of handheld computer 100 for providing directional input. However, keys 117 do not enable a user to provide a plurality of directional inputs, nor is there a direction (or location) associated with each key that is intuitive to a user in a way that a joypad such as joypad 125 or a joystick provides. Further, conventionally, users utilize a combination of inputs on a touch screen by a stylus as well as directional inputs from a plurality of buttons such as buttons 117 (see FIG. 4) and directional buttons such as up and down buttons which may be conventionally integrated into handheld computer 100 for providing input to application programs and for navigating around display 113. Therefore, an advantage of providing an integrated joypad is that it provides a simplified directional input device for handheld computer 100 while requiring only a small amount of space (real estate) on housing 130, which is a common constraint of handheld computing devices.

In an exemplary embodiment, joypad 125 also includes a receptacle 128 for coupling of a graspable portion 230 (see FIG. 3) extending from joypad 125 to form a joystick device. Receptacle 128 may include, but is not limited to, a threaded aperture, or any other type of mechanical connection configuration allowing relatively simple attachment and detachment of a graspable (joystick) portion 230 therefrom.

Referring now to FIG. 2, stylus 200 is depicted. Stylus 200 includes a body portion 210, an end portion 220 and a tip portion 230. During conventional use, a user grasps body portion 210 and writes with tip 230 on a touch screen, such as touch screen 113 (FIG. 1). In an exemplary embodiment, tip 230 and/or end 220 may be removed from body 210 by, for example, unscrewing tip 230 or end 220 from body 210. Tip 230 includes a threaded portion 235 for coupling and decoupling from body 210. Shaft 235 may include any of a variety of coupling and decoupling structures, such as, but not limited to clips, balls, and other type of fastening structures. In an exemplary embodiment, either tip 230 or end 210 or any other section and/or portion of stylus 200 may be utilized as a graspable portion of a joystick which is inserted into receptacle 128 of joypad 125 as depicted in FIG. 3. Further, receptacle 128 may be configured to receive any of a variety of other graspable portions, such as a dedicated joystick handle, a pen tip, or any of a variety of other substantially stiff elements that may be used as a graspable portion for a joystick.

FIGS. 1, 4, and 5 depict handheld computer 100 with tip 230 coupled to receptacle 128 of integrated joypad 125 such that the combination of joypad 125 and connected stylus tip 230 forms a joystick that is provided for directional input to handheld computer 100. A user is able to control the movement of tip 230 with a single finger, multiple fingers or any parts of the hand. As tip 230 is moved in a direction (as depicted in FIG. 5), joypad 125 is similarly tilted in the same direction and effectuates an electrical signal.

During use, should a user wish to transition from using the stylus as a writing or pointing device for handheld computer 100, a user detaches tip 230 from stylus 200 by unscrewing tip 230 from body 210. The user then screws threaded portion 235 of tip 230 into receptacle 128. Receptacle 128 preferably has a screw thread therein configured to accept threaded portion 235.

While the detailed drawings, specific examples and particular formulations given describe exemplary embodiments, they serve the purpose of illustration only. The hardware and software configurations shown and described may differ depending on the chosen performance characteristics and physical characteristics of the computing devices. For example, the type of computing device, input device buttons, or configuration used may differ. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A handheld computer, comprising:

a housing;

a display supported by the housing, the display being a touch screen display configured to be used with a stylus;

computing electronics supported by the housing and configured to communicate with the display; and an integrated input device configured to provide input to the handheld computer, the input device providing different input signals to the computing electronics dependent on a directional movement provided by a user, the input device configured to communicate more than four distinct directional movements from a user to the computing electronics;

wherein the integrated input device includes a receptacle for coupling a graspable portion thereto, the input device providing input signals based on movement of the graspable portion when the graspable portion is coupled in the receptacle, at least a portion of the stylus is configured to be coupled to the integrated input device and a first portion of the stylus is configured to be unscrewed from a second portion of the stylus and the first portion of the stylus is configured to be screwed into the receptacle.

2. The handheld computer of claim 1, wherein the integrated input device is a pad.

3. The handheld computer of claim 1, wherein the integrated input device is a button.

4. The handheld computer of claim 1, wherein the receptacle includes an aperture.

5. A handheld computer, comprising:

a housing;

a display supported by the housing, the display being a touch screen display configured to be used with a stylus;

computing electronics supported by the housing and configured to communicate with the display; and an integrated input device configured to provide input to the handheld computer, the input device providing different input signals to the computing electronics dependent on a directional movement provided by a user, the input device configured to communicate more than four distinct directional movements from a user to the computing electronics;

wherein the integrated input device includes a receptacle for coupling a graspable portion thereto, the input device providing input signals based on movement of the graspable portion when the graspable portion is coupled in the receptacle, at least a portion of the stylus is configured to be coupled to the integrated input device and a first portion of the stylus is configured to be unsnapped from a second portion of the stylus and the first portion of the stylus is configured to be snapped into the receptacle aperture.

6. A handheld computer, comprising:

a housing;

data processing electronics disposed within the housing;

a display disposed in the housing and coupled to the data processing electronics, the display including a touch screen configured to be used with a stylus;

a joypad coupled to the data processing electronics and configured to communicate signals to the data processing electronics dependent on the direction in which the joypad is moved, the joypad being movably integrated into the housing; and a joystick coupler integrated into the joypad, the joystick coupler configured to receive at least a portion of the stylus which is configured to act as a joystick.

7. The handheld computer of claim 6, wherein the joystick coupler includes a screw thread.

8. The handheld computer of claim 6, wherein the joystick coupler includes a flexible fitting.

9. The handheld computer of claim 6, wherein the joypad is configured to communicate signals corresponding to eight discrete directional user inputs.

10. A method of assembling a joystick for a handheld computer, comprising:

providing a handheld computer with a joystick receptacle;

providing a stylus having a detachable portion;

detaching a detachable portion from the stylus; and coupling the detachable portion to the receptacle.

11. The method of claim 10, wherein the joystick receptacle is part of a joypad integrated into the handheld computer.

12. The method of claim 10, wherein the receptacle includes a screw thread.

13. The method of claim 10, wherein the detachable portion is the stylus tip.

*14. A handheld computer, comprising:*

*a housing configured to be carried by a user while the handheld computer is in use;*

*data processing electronics disposed within the housing and configured to synchronize personal information management data on the handheld computer with a computer;*

*a display screen disposed within the housing and coupled to the data processing electronics;*

*a joypad coupled to the data processing electronics and configured to communicate signals to the data processing electronics dependent on the direction in which the joypad is moved, the joypad being movably integrated into the housing; and*

*an input device disposed in an aperture in the joypad.*

*15. The handheld computer of claim 14, wherein the data processing electronics further include an electronic calendar application and a word processing application.*

*16. The handheld computer of claim 14, wherein the input device comprises a button.*

*17. The handheld computer of claim 14, wherein the handheld computer comprises a cellular phone.*

*18. The handheld computer of claim 14, further comprising at least one input button for automatically launching an application configured to run on the data processing electronics.*

*19. The handheld computer of claim 14, wherein the data processing electronics are configured to download software to be run on the data processing electronics.*

*20. A handheld computer, comprising:*

*a housing configured to be carried by a user while in the handheld computer is in use;*

*data processing electronics disposed within the housing and configured to synchronize personal information management data on the handheld computer with a computer;*

*a display screen disposed within the housing and coupled to the data processing electronics;*

*a joypad coupled to the data processing electronics and moveable in at least four directions, the joypad configured to communicate signals to the data processing electronics dependent on the direction in which the joypad is moved, the joypad being movably integrated into the housing; and*

*an input device disposed in an aperture in the joypad.*

*21. The handheld computer of claim 20, wherein the handheld computer comprises a cellular phone.*

*22. The handheld computer of claim 20, further comprising at least one input button for automatically launching an application configured to run on the data processing electronics.*

*23. The handheld computer of claim 22, wherein the application is an electronic calendar application.*

*24. The handheld computer of claim 20, wherein the data processing electronics are configured to download software to be run on the data processing electronics.*

* * * * *